Patented July 7, 1942

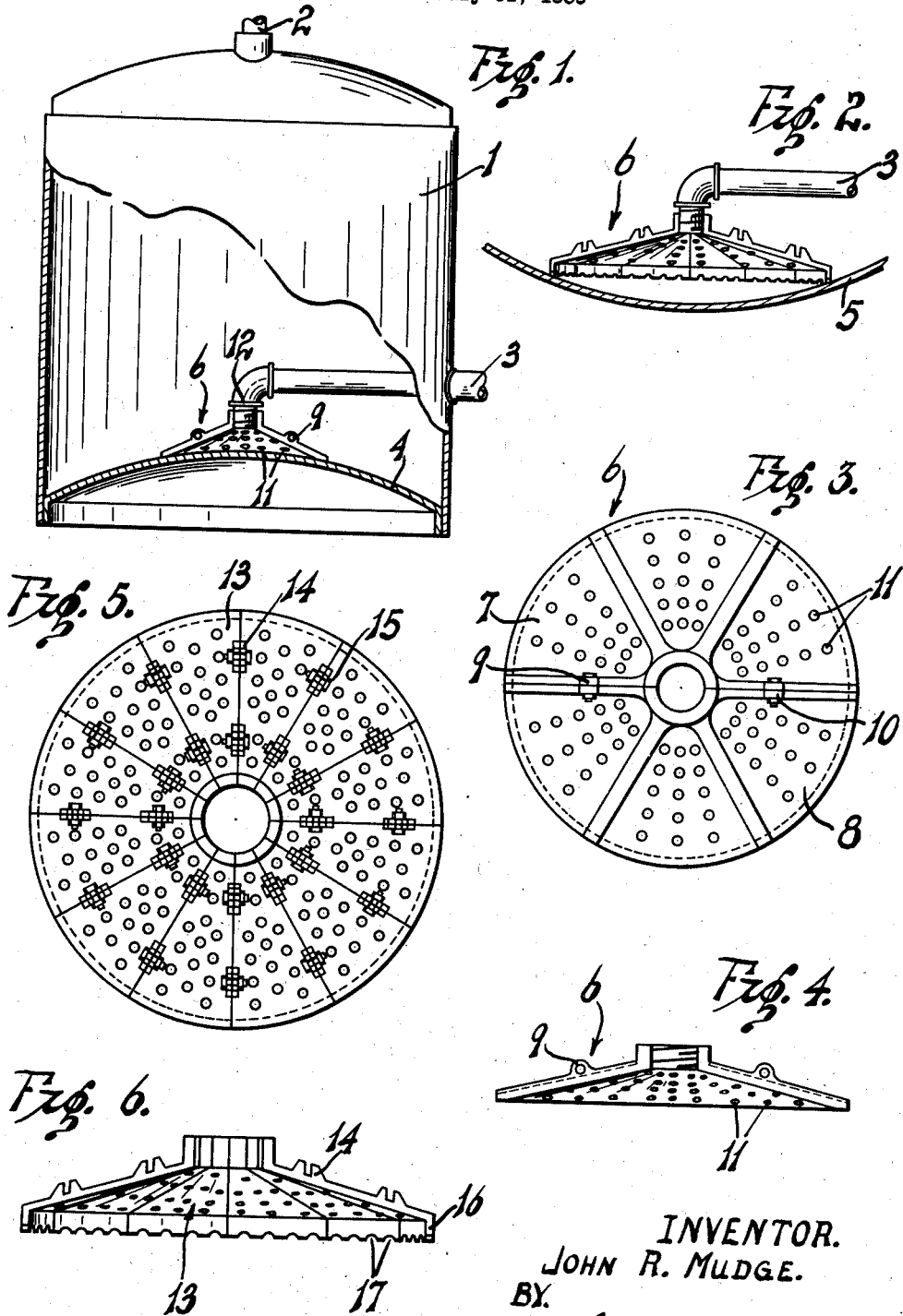

2,288,593

UNITED STATES PATENT OFFICE 2,288,593

UNDERDRAIN FOR FILTERS

John R. Mudge, Los Angeles, Calif.

Application July 31, 1939, Serial No. 287,431

5 Claims. (Cl. 210—171)

This invention relates to an underdrain construction for filters, particularly those filters which are used in connection with swimming pools, and the like. Heretofore, the underdrain in the filter has been set on a concrete bed, all of which was costly and difficult to place in the filter, as well as other inherent difficulties.

An object of my invention is to provide a novel underdrain for filters, which eliminates the necessity of a concrete bed, and enables the filter drain to be easily and quickly placed within the filter housing.

Another object is to provide a novel underdrain for filters, which is sectional and can, therefore, be placed within the filter housing through the usual manhole, and assembled within the filter housing.

A feature of my invention resides in a cast underdrain, in which a plurality of holes are cored, thus distributing the water over the bottom of the filter, and eliminating the concrete fill or bed heretofore used in filters of this character.

Other objects, advantages and features of invention may appear from the accompanying drawing, the subjoined detailed description, and the appended claims.

In the drawing:

Figure 1 is a side elevation of a filter, with parts broken away to show interior construction, and with one-half of the underdrain shown in position.

Figure 2 is a side elevation of one-half of an underdrain assembly in position on a convex filter bottom.

Figure 3 is a top plan view of my underdrain.

Figure 4 is a side elevation of one-half of my underdrain.

Figure 5 is a top plan view of a modified type of my underdrain.

Figure 6 is a side elevation of one-half of the underdrain, shown in Figure 5.

Referring more particularly to the drawing, the numeral 1 indicates a filter housing, which includes an inlet 2, and an outlet pipe 3, which extends preferably through the side of the housing 1, and extends inwardly to substantially the center of the filter, as shown in Figure 1. The bottom head of the housing 1 may be either concave, as shown at 4, or convex, as shown at 5, in Figure 2. The filter housing 1 is filled with suitable layers of sand, graded gravel, and the like, all of which is usual and well-known in filter constructions where large quantities of water are to be filtered, as is the case for swimming pools, and the like.

My underdrain 6 consists of a substantially cone shaped body, which rests on the bottom 4 or 5, and is perforated as will be further described, so as to exclude gravel, and the like, from the outlet pipe 3. When it is necessary to clean the filter, the flow of water therethrough is reversed—that is, water is then pumped through the pipe 3, passes through the underdrain 6, thence upwardly through the filter pack, and out through the pipe 2. The filter drain thus serves the double use of straining the aggregate from the water which passes through the filter, and also distributes the water over the bottom of the filter housing. The underdrain 6 is preferably made of cast iron, bronze, or the like, and consists of two complementary and symmetrical sections 7 and 8. The abutting faces of the section 7—8 are each provided with ears 9 and 10, and bolts extend through these arms, thus assembling the parts 7 and 8 into the complete conelike underdrain. A plurality of holes 11 are cored or drilled in the sections 7 and 8, and the water passes through these holes and is distributed, as previously described. A pipe fitting 12 extends into the top of the underdrain 6 and this fitting is attached to the pipe 3 substantially as shown in Figure 1.

Figures 5 and 6 disclose an underdrain which consists of a plurality of symmetrical and complementary sections 13, which may be assembled into the complete cone-like underdrain as shown. Each of the sections 13 are provided with one or more ears 14, which match with the ear on the adjacent section, and a bolt 15 extends through the matched ears, thus bolting the sections of the underdrain together to form a complete assembly. At the outer ends of each of the sections 13, a depending flange 16 is provided, and openings 17 are provided on the lower edge of these flanges to permit the movement of water into or out of the underdrain.

For underdrains of large diameter, it is preferable to provide a plurality of sections which may be bolted together, as shown in Figures 5 and 6. Each of the sections can then be lowered through the manhole in the filter housing 1, while for filter drains of lesser diameter, two sections would be sufficient, as shown in Figures 3 and 4.

Having described my invention, I claim:

1. An underdrain for filters adapted to be positioned within the filter, and the open ended base of the underdrain resting on the lower head of the filter, comprising a cone-like hollow body, a pipe extending from the apex of the hollow body to the outside of the filter, said hollow body having a plurality of drain holes therein and spaced over the surface of the hollow body, said hollow body comprising a pair of complementary sections formed as sectors, matching ears on each of the sections, and fasteners extending through the ears whereby the sections are assembled to form the completed underdrain.

2. An underdrain for filters adapted to be positioned within the filter, and the open ended base of the underdrain resting on the lower head of the filter, comprising a cone-like hollow body, a pipe extending from the apex of the hollow body to the outside of the filter, said hollow body having a plurality of drain holes therein and spaced over the surface of the hollow body, said hollow body comprising a plurality of segmental and complementary sections formed as sectors, each of said sections having matching ears thereon, fasteners extending through said ears whereby the segmental sections are assembled to form the completed underdrain.

3. An underdrain for filters adapted to be positioned within the filter and the open ended base of the underdrain resting on the lower head of the filter, comprising a cone-like hollow body, a pipe extending from the apex of the hollow body to the outside of the filter, said hollow body having a plurality of drain holes therein and spaced over the surface of the hollow body, said hollow body comprising a pair of complementary sections formed as sectors, matching ears on each of the sections, and fasteners extending through the ears whereby the sections are assembled to form the completed underdrain, said underdrain having openings extending through the periphery thereof.

4. An underdrain for filters adapted to be positioned within the filter, and the open ended base of the underdrain resting on the lower head of the filter, comprising a cone-like hollow body, a pipe extending from the apex of the hollow body to the outside of the filter, said hollow body having a plurality of drain holes therein and spaced over the surface of the hollow body, said hollow body comprising a plurality of segmental and complementary sections formed as sectors, each of said sections having matching ears thereon, fasteners extending through said ears whereby the segmental sections are assembled to form the completed underdrain, said underdrain having openings extending through the periphery thereof.

5. An underdrain for filters adapted to be positioned within the filter and the open ended base of the underdrain resting on the lower head of the filter, comprising a cone-like hollow body, a pipe extending from the apex of the hollow body to the outside of the filter, said body having a plurality of drain holes extending therethrough and spaced over the surface of the hollow body, said hollow body comprising a plurality of complementary sections, each section formed as a sector, matching ears on each of the sections, and fasteners extending through the ears whereby the sections are assembled to form the completed underdrain, a depending flange on each of the sections, the depending flanges having openings extending therethrough.

JOHN R. MUDGE.